United States Patent [19]

Gaenzler et al.

[11] 3,876,694

[45] Apr. 8, 1975

[54] METHOD FOR THE OXYCARBONYLATION OF OLEFINS

[75] Inventors: Wolfgang Gaenzler, Darmstadt-Eberstadt; Klaus Kabs, Seeheim; Guenter Schroeder, Ober-Ramstadt, all of Germany

[73] Assignee: Rohm G.m.b.H. Chemische Fabrik, Darmstadt, Germany

[22] Filed: Aug. 3, 1973

[21] Appl. No.: 385,260

[30] Foreign Application Priority Data
Aug. 7, 1972  Germany............................ 2238837

[52] U.S. Cl.............. 260/533 A; 252/432; 252/433; 252/441; 252/442; 252/466 R; 252/473; 260/497 A
[51] Int. Cl........................ C07c 51/14; C07c 57/04
[58] Field of Search.................. 260/533 AN, 538 A

[56] References Cited
UNITED STATES PATENTS
3,346,625 10/1967 Fenton et al................. 260/533 AN
3,349,119 10/1967 Fenton et al................. 260/533 AN Primary Examiner—Lorraine A. Weinberger
Assistant Examiner—Richard D. Kelly
Attorney, Agent, or Firm—Curtis, Morris & Safford

[57] ABSTRACT

An improved method for the oxycarbonylation of olefins to form the corresponding $\alpha,\beta$-unsaturated carboxylic acids in a substantially non-aqueous reaction medium utilizing a catalyst system consisting essentially of A. at least one compound of aluminum, boron or an alkaline earth metal and B. a compound of palladium that is soluble in the reaction medium.

8 Claims, No Drawings

METHOD FOR THE OXYCARBONYLATION OF OLEFINS

The present invention relates to a process for the production of $\alpha,\beta$-unsaturated aliphatic carboxylic acids by oxycarbonylation of olefins, i.e. by reacting them with carbon monoxide and oxygen in the presence of catalysts.

Processes are already known in which, for instance, acrylic acid, crotonic acid or methacrylic acid can be prepared in this manner. In accordance with DOS (Unexamined Application for German Patent-Deutsche Offenlegungsschrift) 14 93 375 published Apr. 10, 1969, metals of the platinum group or their compounds are useful as catalysts. Halogen-containing compounds are added as solubilizers, for instance ammonium or alkali chlorides or bromides or lithium chloride, and to regenerate the noble metal catalyst, compounds of copper, iron, manganese, cobalt, mercury, nickel, cerium, chromium molybdenum or vanadium are added, i.e. compounds of metals having a higher oxidation potential than that of platinum. Palladium chloride in combination with lithium chloride and copper chloride is considered the preferred catalyst system. It is used, for instance, in glacial acetic acid as solvent for the oxycarbonylation of ethylene, acrylic acid and the $\beta$-acetoxy propionic acid produced therefrom by the addition of acetic acid being obtained. The $\beta$-acetoxy propionic acid can be split by heat back into acrylic acid and acetic acid. Upon the corresponding reaction of propylene, crotonic acid is produced as main product and in addition also some methacrylic acid.

There are a number of practical disadvantages to this process. Thus, for instance, the palladium used as catalyst is not only very expensive, but it is also difficult to recover it from spent catalysts. In particular, the separation of the palladium from copper and other heavy metals affords considerable difficulties.

In our earlier application, Ser. No. 382,378 filed July 25, 1973 (now abandoned and refiled on May 8, 1974 as continuation-in-part application Ser. No. 468,064), we described a process for carrying out the oxycarbonylation with a catalyst system consisting essentially of at least one compound of aluminum, boron or alkaline earth metal and at least one compound of an element of Groups IV B to VII B of the periodic system. We ventured the opinion that the metal compounds used as catalysts in said process form multi-nuclear complexes or multi-ring complexes, but that no details are as yet known to the structure of such complexes. In the process of DOS 14 93 375, in which the same starting materials are converted into the same end products with the aid of metals of the platinum group, especially palladium, as catalysts, multi-nuclear complexes apparently play no part. Metals with a high oxidation potential, e.g., cupric compounds, can be used with metals of the platinum group. However, other oxidizing agents, such as halides and nitric oxide, can be used instead. Multi-nuclear complexes are not contemplated in the theoretical reaction mechanism described in detail by Fenton and Olivier (Chemtech 1972, pp. 220–225). The metal compounds that are used with the platinum-group metals do not actually take part in the oxycarbonylation of the olefin. However, they are indispensible as oxidizing agents for the platinum metal catalysts.

In accordance with the present invention, $\alpha,\beta$-unsaturated aliphatic carboxylic acids are prepared from the corresponding olefins, carbon monoxide and oxygen or air in liquid phase in the absence of water and in the presence of a catalyst in which there is employed, as catalyst, a mixture soluble in the fluid used as liquid phase, consisting essentially of:

A. At least one compound of aluminum, boron or an alkaline earth metal, and
B. A compound of palladium.

The metal compounds used as catalyst should be at least of limited solubility in the reaction medium. However, they can also pass into the solution by chemical reaction; for instance metal oxides or hydroxides which pass into the corresponding acetates in acetic acid can be employed. It is sufficient for a catalytically active quantity of the metal compounds to pass in solution at the reaction temperature, possibly merely in the presence of all other reactants, while the solubility at room temperature in the pure organic liquid may be any desired. If the catalytically active complex is not present in dissolved form in the reaction mixture, it must have at least formed from the dissolved components. The catalyst components are in general added in an amount of 0.01 to 5 percent by weight, referred to the liquid medium. If the quantity of catalyst is too small or the solubility too low, an unsatisfactory space-time yield is obtained.

Combinations of metal compounds that are particularly suitable as catalysts are, e.g., compounds of palladium and aluminum, palladium and calcium, and palladium and magnesium. Suitable metal compounds are, for instance, the chlorides, bromides, chlorates, nitrates, carbonates, hydroxides, oxides, formates, acetates, benzoates, phthalates, picrates, acetyl acetonates, etc. Salts free of water of crystallization are in principle preferred. The carbonyls and complexing agents of the metals can also be used so long as they have at least the required limited solubility in the reaction medium.

Although in accordance with the invention a catalyst system is used having, as a component, an element of the platinum group, it is clear that said catalyst system is distinctly different than the system disclosed in DOS 14 93 375, in which an oxidizing metal compound or some other oxidizing agent must be present in addition to the platinum-group metal. Instead, a multi-ring complex is believed to be present formed, not by an oxidizing metal, but by aluminum, boron or alkaline earth metal compounds.

In the catalyst system of the invention, the palladium compound component has substantially the same effectiveness and versatility as a compound of a metal of side Group IV B to VII B of the periodic table. The reaction conditions are likewise similar, as indicated more fully later. In comparison with other catalyst systems heretofore suggested which do not contain compounds of aluminum, boron or alkaline earth metals, the catalyst system of the present invention has the advantage that, under similar conditions, higher yields of $\alpha,\beta$-unsaturated carboxylic acids are obtainable. An additional and important advantage resides in the work-up of the catalyst. After prolonged operation, non-volatile impurities unavoidably accumulate in the reaction system. These can be completely removed only by separation of pure palladium compound from the contaminated catalyst system. This separation is comparatively simple when the other catalyst component is a compound of aluminum, boron or alkaline earth metal. Isolation of a pure palladium compound from a contaminated palladium-copper catalyst system is considerably more difficult.

In order to carry out the process in anhydrous form, it is not sufficient merely to use all the reactants in anhydrous form. Small quantities of water can be formed by side reaction and then disturb the course of the reaction. In this respect the process of the invention has certain similarities to the process in accordance with DOS 14 93 375. In the latter, various possibilities are indicated for the removal of water from the reaction mixture, which possibilities can also be employed in the present process. This includes, in particular, the addition of compounds which react with water, for instance the acid anhydrides or acid chlorides of the carboxylic acids to be produced or used as organic medium, or the use of molecular sieves.

The reaction medium and the catalyst components are so adapted to each other that at least a catalytically active quantity of the metal compounds can pass into solution. Due to the fundamentally strong polar nature of the metal compounds, strongly polar anhydrous liquids enter particularly into consideration. There are preferably employed aliphatic carboxylic acids such as acetic acid, propionic acid or crotonic acid. Other suitable organic liquids are formamide, mono- and dimethyl formamide, acetamide, N-substituted acetamides, acetone, methyl ethyl ketone, cyclohexanone, dimethyl carbonate, methyl formate, diethyl oxylate, of which the less polar liquids are used primarily in admixture with more strongly polar liquids, particularly when the metal compounds are particularly strongly polar. Certain organic liquids, such as, for instance, acetyl acetone, dimethyl formamide, dimethyl sulfoxide or hexamethyl phosphoryl triamide, themselves exert a complexing action and can detrimentally affect the course of the reaction, for which reason their suitability must be carefully checked in each individual case.

The liquid reaction medium is advantageously so selected that it can be easily separated - in particular by distillation- from the $\alpha,\beta$-unsaturated carboxylic acid formed. Therefore, low-boiling liquids are preferably used for the production of high-boiling carboxylic acids, and vice versa. However, the acid which is to be produced can itself be used as reaction medium, thereby avoiding all problems as to separation, i.e. acrylic acid for the oxycarbonylation of ethylene, or methacrylic acid for the oxycarbonylation of propylene.

The molar ratio of the components A and B can vary within wide limits. An excess of component A over the equimolar ratio is in general favourable. If several compounds derived from different elements are used for catalyst component A, the sum of their molar fractions is used in the ratio.

Different combinations of components A and B may have somewhat different properties and accordingly are most favorably used under different conditions. Thus, whereas some combinations operate most effectively when pressures of the reaction gases are as high as 200 atm., others show satisfactory activity even at normal pressure. To be sure, the space-time yield is generally improved by operation under pressure. Catalyst combinations which give a high conversion and selectivity at moderate pressures, for instance of 5 to 15 atm., are particularly interesting from a technological standpoint. Aluminum chloride/palladium chloride is one example of such a system.

The same is true of the reaction temperatures. While a few systems permit reactions at room temperature or moderately elevated temperature, others are most active only at 150° to 300°C. In most cases, temperatures within the range of 80° to 200°C. are most favorable.

In principle, it is possible and furthermore advisable for the testing of catalyst systems to carry the process out batchwise by charging an autoclave with a liquid medium containing catalyst, introducing the reaction gases under pressure and heating to reaction temperature. However, a fully continuous operation is preferred for the carrying out of the process of the invention on an industrial scale.

In this case the liquid phase is intimately contacted in a reactor with the gaseous starting substances, a part of the liquid phase is continuously removed, and the unsaturated acid is isolated in known manner, whereupon the catalyst-containing reaction medium is returned to the reactor. The gaseous phase need not necessarily be recycled, since the reaction product remains in the liquid phase. To be sure, it will also be necessary continuously to replace a part of the gaseous phase in order to remove foreign gases such as nitrogen or carbon dioxide.

In the oxycarbonylation of ethylene, various by-products can be produced in different proportions in addition to acrylic acid, namely $\beta$-acetoxy propionic acid, which can easily be split by heat into acrylic acid and acetic acid, as well as propionic acid. In the production of methacrylic acid, it is possible for $\beta$-acetoxy-n-butyric acid and isobutyric acid to be produced in addition to its isomer, crotonic acid. These by-products may be of interest as intermediates for organic syntheses. The removal of the by-products from the acrylic or methacrylic acid is difficult due to the high boiling points and entails the risk of polymerization. Since an esterification of the acids with low alcohols to form low acrylic and methacrylic acid esters which are of great industrial importance for the manufacture of vinyl polymers is in any event generally intended, it is advisable to distill the resultant acid mixture in vacuum without carrying out any measures of separation, then esterifying the distillate in known manner, and only then subjecting the esters which are of substantially lower boiling point to a careful fractional distillation for its purification.

A particularly advantageous manner of carrying out the improved process is described in the following examples: Examples In each of a series of tests, 450 ml. glacial acetic acid and 50 ml. acetic acid anhydride were introduced into a 2 l. autoclave. After dissolving the catalyst components therein, the autoclave was charged with ethylene (Example 1) or propylene (Examples 2-5) and with carbon monoxide and oxygen. The autoclave was then heated to about 110°-120°C., whereupon reaction commenced, as indicated by a further increase in temperature and a reduction in pressure.

The conditions and results were:

| Ex. | Pressures (at. gage) Olefin | CO | $O_2$ | Catalyst Components, g. | | Acid Products, g. Acrylic | Propionic |
|---|---|---|---|---|---|---|---|
| 1 | 30 | 30 | 10 | 0.5 $PdCl_2$ 5.0$AlCl_3$ | 1.0 LiCl | 43.5 | 4.6 |
|  |  |  |  |  |  | Crotonic | Methacrylic |
| 2 | 15 | 80 | 20 | 1.0 $PdCl_2$ 10$CaCl_2$ | 10Ca(OAc)$_2$ | 30 | 0.4 |
| 3 | 10 | 80 | 20 | 1.0 PdCl 10$MgCl_2$ | 10Mg(OAc)$_2$ | 15 | 0.2 |
| 4 | 10 | 80 | 20 | 1.0 $PdCl_2$ 10Al(OAc)$_3$ | 10LiCl | 45 | 0.2 |
| 5 | 10 | 80 | 20 | 1.0 $PdCl_2$ 10$CuCl_2$ | 10LiCl 30NaOAc | 23.5 | 2 |

(Comparison)

Note: "OAc" stands for an acetate anion.

What is claimed is:

1. In the method for preparing α,β-unsaturated carboxylic acids by the oxidative carbonylation of an olefin with oxygen and carbon monoxide, in a substantially non-aqueous reaction medium in the presence of a catalytic amount of a catalyst soluble in said non-aqueous medium, the improvement wherein said catalyst is a mixture consisting essentially of:
   A. at least one compound of aluminum, boron or an alkaline earth metal, and
   B. a compound of palladium that is soluble in the reaction medium.

2. The method defined in claim 1 wherein catalyst component A is aluminum chloride, aluminum acetate, calcium chloride, calcium acetate, magnesium chloride, magnesium acetate or a combination thereof.

3. The method defined in claim 1 wherein catalyst component A is an aluminum compound.

4. The method defined in claim 1 wherein catalyst component A is anhydrous aluminum chloride or aluminum acetate.

5. The process as defined in claim 1 wherein catalyst component B is a chloride, bromide, chlorate, nitrate, carbonate, hydroxide, formate, acetate, benzoate, phthalate, picrate, acetylacetonate of palladium, or of a carbonyl or complex compound thereof.

6. The process as defined in claim 1 wherein catalyst component B is palladium chloride.

7. The method defined in claim 1 wherein the olefin is propylene and the catalyst is a mixture of anhydrous calcium chloride, calcium acetate and palladium chloride.

8. The method defined in claim 1 wherein the olefin is propylene and the catalyst is a mixture of anhydrous magnesium chloride, magnesium acetate and palladium chloride.

* * * * *